US010336302B2

(12) United States Patent
Graney

(10) Patent No.: US 10,336,302 B2
(45) Date of Patent: Jul. 2, 2019

(54) CONTACT SENSOR ASSEMBLY FOR BRAKE SYSTEMS IN AUTONOMOUS VEHICLES

(71) Applicant: GM GLOBAL TECHNOLOGY OPERATIONS LLC, Detroit, MI (US)

(72) Inventor: Matthew Graney, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 205 days.

(21) Appl. No.: 15/634,959

(22) Filed: Jun. 27, 2017

(65) Prior Publication Data
US 2018/0370503 A1    Dec. 27, 2018

(51) Int. Cl.
*B60T 1/10*        (2006.01)
*B60T 7/18*        (2006.01)
*B60T 7/22*        (2006.01)
*B60T 8/00*        (2006.01)
*B60T 8/17*        (2006.01)
*G01L 5/00*        (2006.01)
*B60T 17/22*       (2006.01)
*B60W 30/00*       (2006.01)
*F16D 61/00*       (2006.01)
*G01S 13/93*       (2006.01)
*G01S 17/00*       (2006.01)

(52) U.S. Cl.
CPC ................. *B60T 7/22* (2013.01); *B60T 1/10* (2013.01); *B60T 7/18* (2013.01); *B60T 8/00* (2013.01); *B60T 8/17* (2013.01); *B60T 17/22* (2013.01); *B60W 30/00* (2013.01); *F16D 61/00* (2013.01); *G01L 5/0052* (2013.01); *B60T 2201/022* (2013.01); *B60T 2201/024* (2013.01); *B60T 2210/36* (2013.01); *B60T 2270/413* (2013.01); *G01S 2013/9346* (2013.01); *G01S 2013/9367* (2013.01)

(58) Field of Classification Search
CPC ..... B60T 7/22; B60T 1/10; B60T 7/18; B60T 8/00; B60T 8/17; B60T 17/22; B60T 2201/022; B60T 2201/024; B60T 2270/413; F16D 61/00; G01S 17/00; G01S 2013/9346; G01S 2013/9367; B60W 30/00; G01L 5/0052
See application file for complete search history.

(56) References Cited

U.S. PATENT DOCUMENTS

| 7,190,260 | B2 * | 3/2007 | Rast | B60Q 1/44 340/467 |
| 7,320,506 | B2 * | 1/2008 | Fagergren | B60T 8/00 188/1.11 R |
| 8,798,906 | B2 * | 8/2014 | Shibata | B60W 30/16 340/447 |
| 9,617,778 | B2 * | 4/2017 | Fukui | E05F 15/77 |
| 2002/0105423 | A1 * | 8/2002 | Rast | B60Q 1/44 340/479 |

* cited by examiner

Primary Examiner — Russell Frejd
(74) Attorney, Agent, or Firm — Lorenz & Kopf LLP

(57) ABSTRACT

An autonomous vehicle includes an autonomous driving system configured to produce a first brake control signal, and a contact sensor assembly mechanically coupled to an exterior surface of the autonomous vehicle. The contact sensor assembly is configured to produce a second brake control signal. A brake system is configured to control braking of the autonomous vehicle by prioritizing the second brake control signal over the first brake control signal.

19 Claims, 6 Drawing Sheets

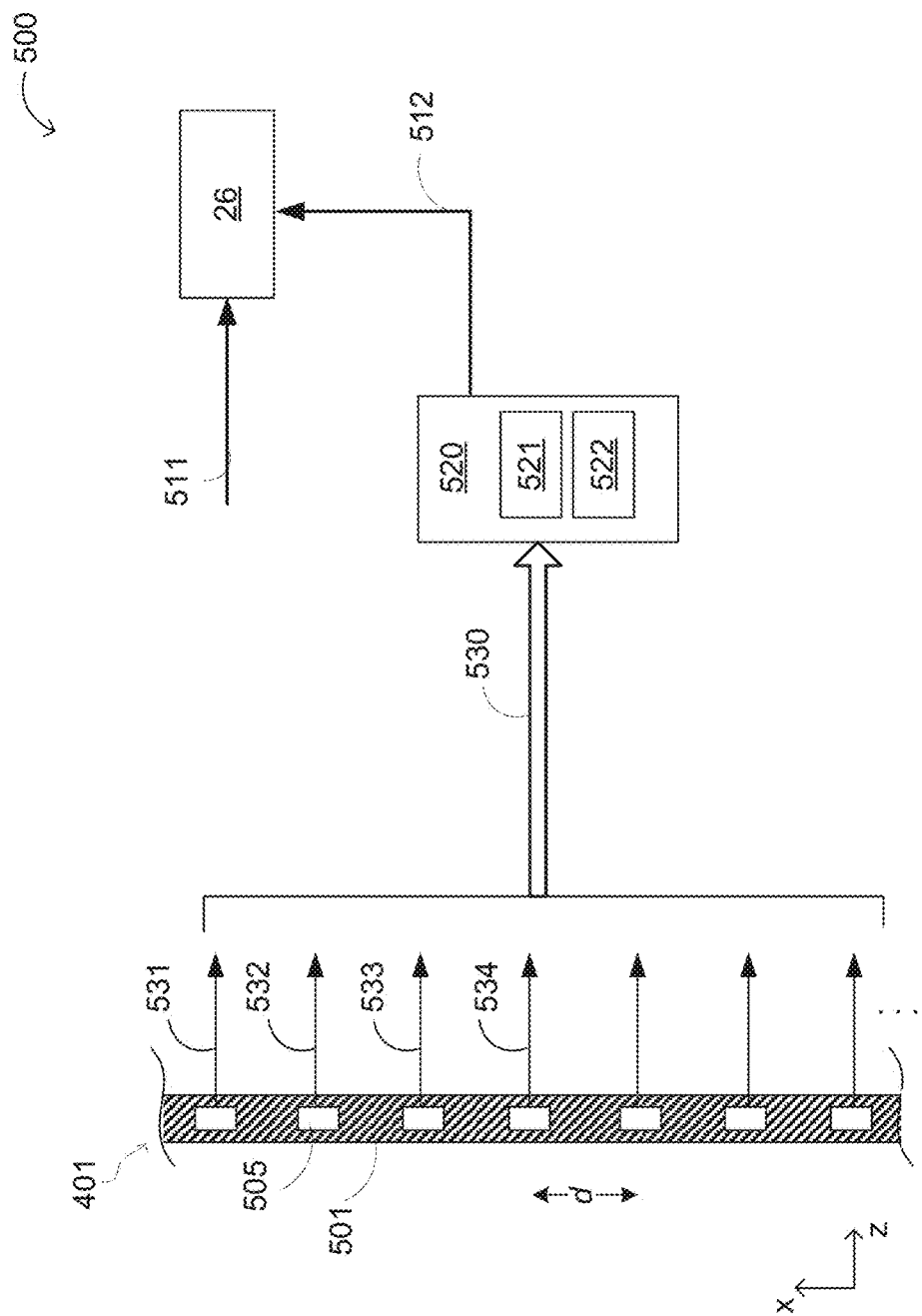

CONTACT SENSOR ASSEMBLY FOR BRAKE SYSTEMS IN AUTONOMOUS VEHICLES

TECHNICAL FIELD

The present disclosure generally relates to vehicles, such as autonomous vehicles, and more particularly relates to brake systems used in connection with autonomous vehicles.

BACKGROUND

An autonomous vehicle is a vehicle that is capable of sensing its environment and navigating with little or no user input. It does so by using sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

While recent years have seen significant advancements in autonomous vehicles, such vehicles might still be improved in a number of respects. For example, while autonomous driving systems are capable of quickly providing appropriate brake control commands to the vehicle's brake system—particularly during emergency braking situations—it might be advantageous in some applications to provide additional, redundant braking systems.

Accordingly, it is desirable to provide improved brake systems and methods for autonomous vehicles. Furthermore, other desirable features and characteristics of the present invention will become apparent from the subsequent detailed description and the appended claims, taken in conjunction with the accompanying drawings and the foregoing technical field and background.

SUMMARY

Systems and method are provided for controlling an autonomous vehicle. In one embodiment, a method includes providing a contact sensor assembly mechanically coupled to an exterior surface of the vehicle, and receiving an output of the contact sensor assembly. The method further includes operating the vehicle utilizing a brake system configured to respond to a first brake control signal, then determining, with a processor, that the contact sensor assembly has made contact with an object based on the output of the contact sensor assembly. The method further includes producing a second brake control signal based, in part, on the output of the contact sensor assembly, and activating the brake system in response to the second brake control signal to override the first brake control signal.

In one embodiment, an autonomous vehicle includes an autonomous driving system configured to produce a first brake control signal, and a contact sensor assembly mechanically coupled to an exterior surface of the autonomous vehicle. The contact sensor assembly is configured to produce a second brake control signal. A brake system is configured to control braking of the autonomous vehicle by prioritizing the second brake control signal over the first brake control signal.

DESCRIPTION OF THE DRAWINGS

The exemplary embodiments will hereinafter be described in conjunction with the following drawing figures, wherein like numerals denote like elements, and wherein:

FIG. 10 is a functional block diagram of a system in accordance with various embodiments.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning, image analysis, brake systems, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
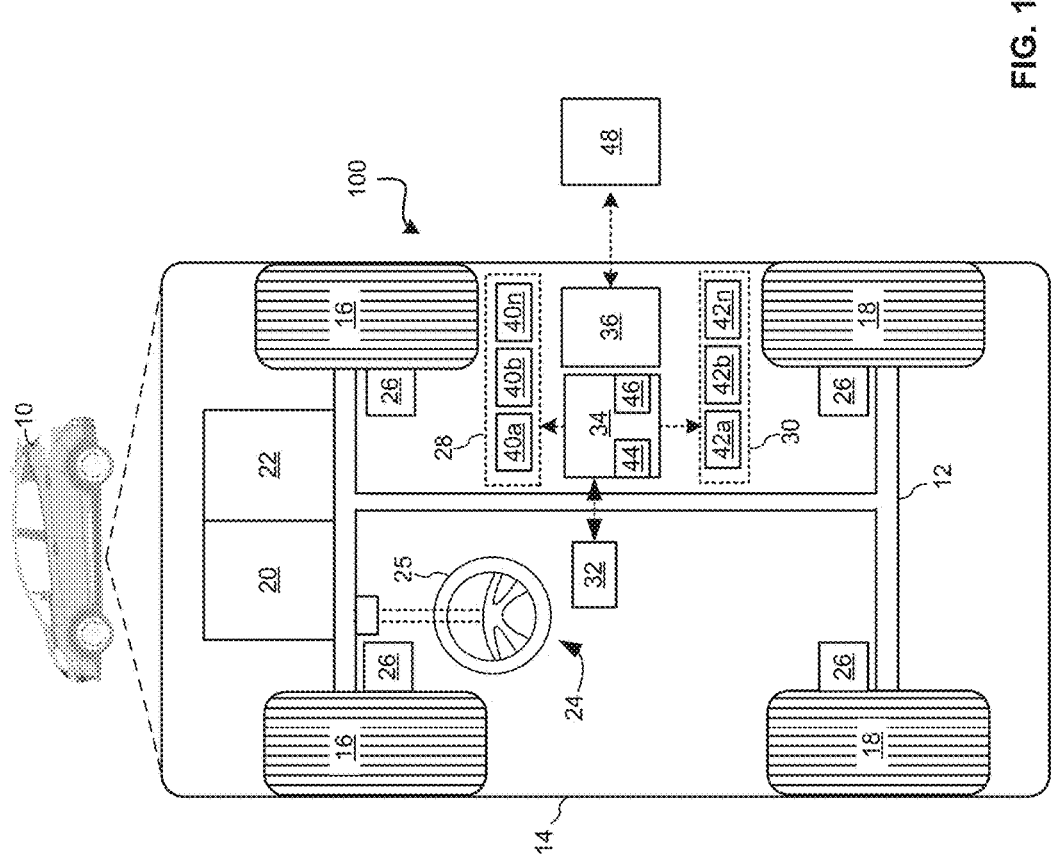
FIG. 1 is a functional block diagram illustrating an autonomous vehicle including a system in accordance with various embodiments.

With reference to FIG. 1, a contact sensor system shown generally as 100 is associated with a vehicle 10 in accordance with various embodiments. As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the contact sensor system 100 is incorporated into autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

In an exemplary embodiment, the autonomous vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. While vehicle 10 is generally referred to herein as an "autonomous vehicle," this term is used without loss of generality, since the present subject matter may be applied to any vehicle or moving platform that employs path planning and which might need to modify an established path based on obstacles in its path.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems. As described further below, brake system 26 may be responsive to both an autonomous driving systems and a redundant, contact sensor system that can quickly activate brake system 26 in the event that vehicle 10 makes contact with an object.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n might include, but are not limited to, radars, lidars, global positioning systems, optical cameras, thermal cameras, ultrasonic sensors, and/or other sensors. In some embodiments, sensing devices 40a-40n include one or more sensors capable of observing occupants of the vehicle and classifying their respective states (e.g., using a trained neural network or other such classification model known in the art). In various embodiments, as described below, sensor system 28 includes a contact sensor assembly that is incorporated into one or more exterior surfaces of vehicle 10.

The actuator system 30 includes one or more actuator devices 42a-42n that control one or more vehicle features such as, but not limited to, the propulsion system 20, the transmission system 22, the steering system 24, and the brake system 26. In various embodiments, autonomous vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. Route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals that are transmitted to the actuator system 30 to automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10. In one embodiment, as discussed in detail below, controller 34 is configured to allow an occupant to select a driving mode based on occupant preferences, vehicle state, and occupant state.

Figure 2:
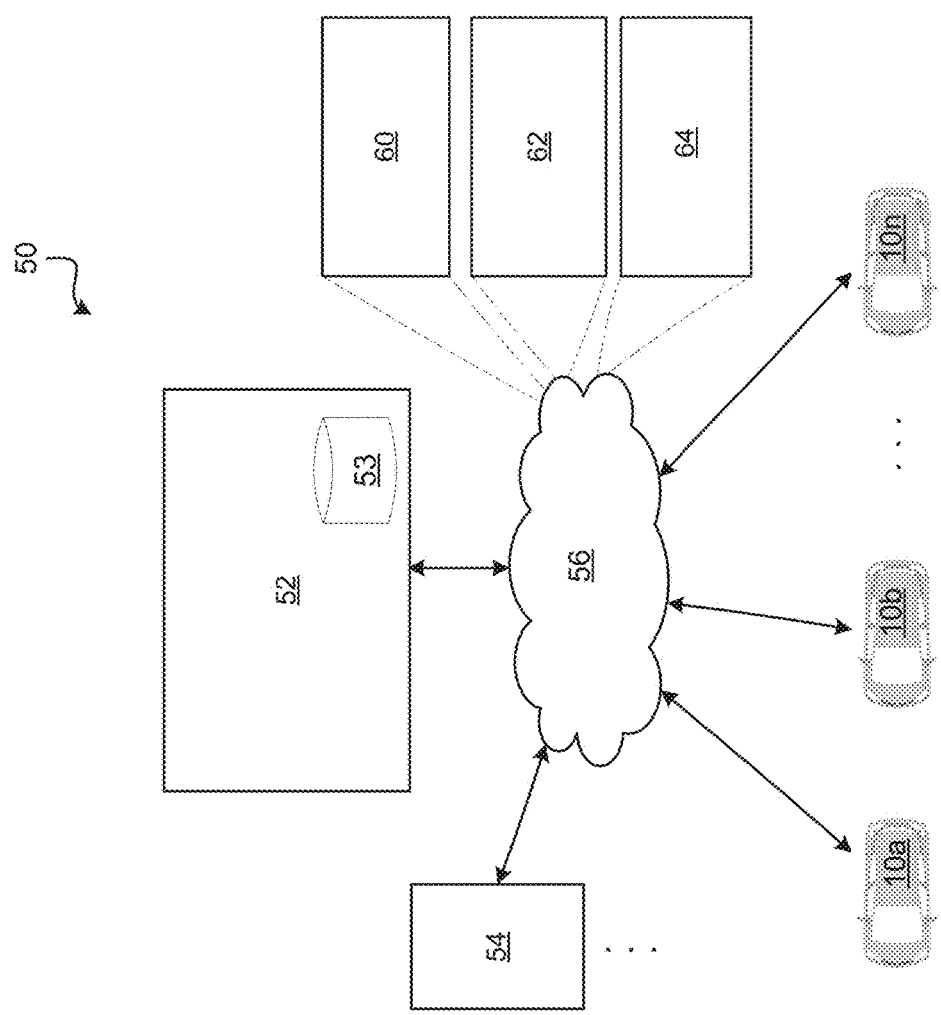
FIG. 2 is a functional block diagram illustrating a transportation system having one or more autonomous vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, a amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system (or simply "remote transportation system") 52 that is associated with one or more autonomous vehicles 10a-10n as described with regard to FIG. 1. In various embodiments, the operating environment 50 (all or a part of which may correspond to entities 48 shown in FIG. 1) further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, biometric data, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
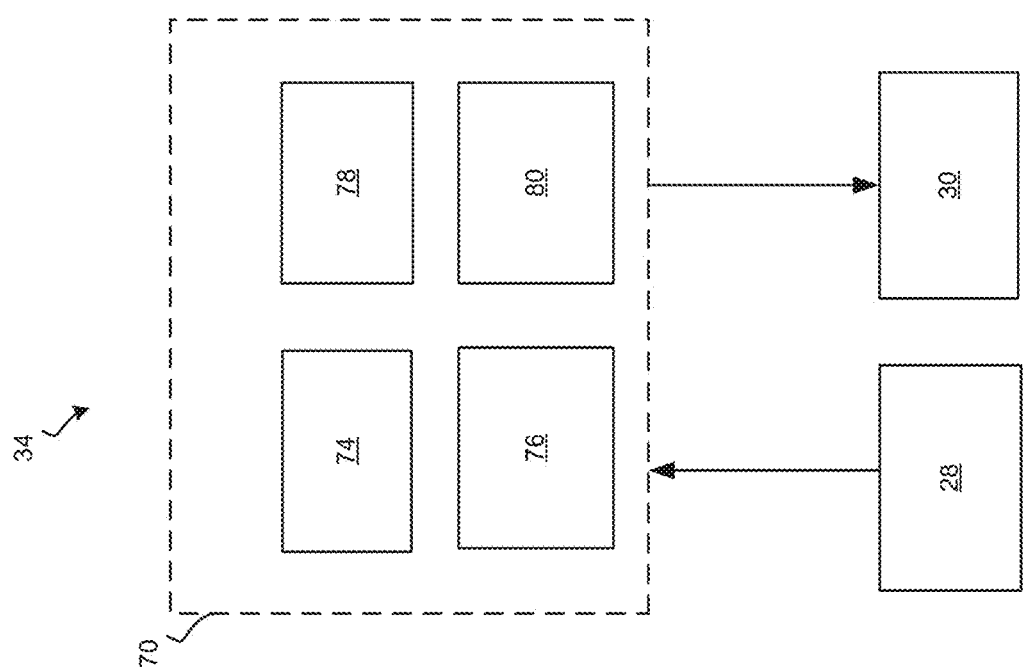
FIG. 3 is functional block diagram illustrating an autonomous driving system (ADS) associated with an autonomous vehicle, in accordance with various embodiments.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

Sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, contact sensor system 100 of FIG. 1 is configured to produce brake control signals to be applied to brake system 26 when vehicle 10 makes contact with an object and when certain predetermined criteria are met (e.g., range of speeds, level of sensed force, etc.).

Figure 4:
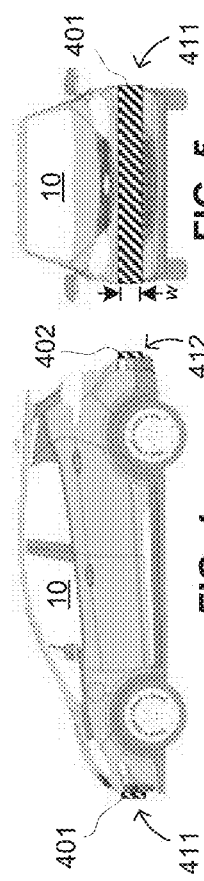
FIGS. 4-7 depict various views of a vehicle including contact sensor assemblies in accordance with various embodiments.
Figure 5:
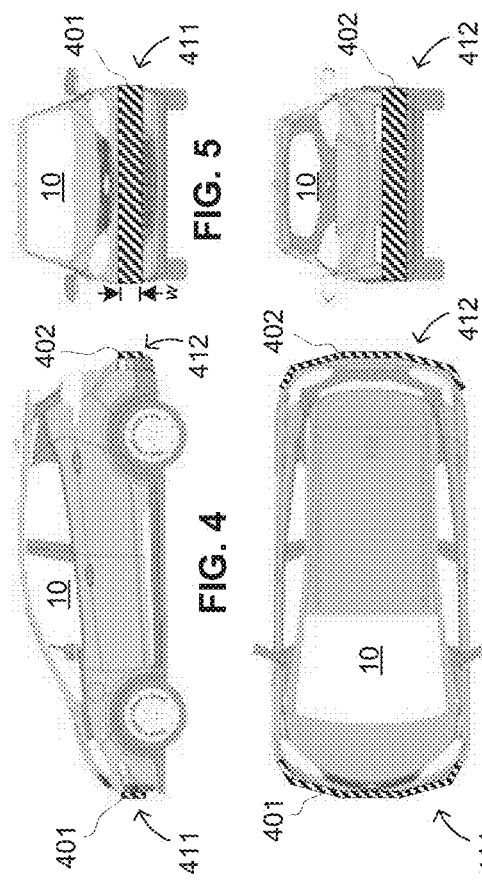

In that regard, FIGS. 4-7 depict various views of a vehicle including a contact sensor assembly in accordance with one embodiment. More particularly, FIG. 4 is a side view of an exemplary vehicle 10 having a front bumper region 411 and a rear bumper region 412. A contact sensor assembly portion 401 is attached to (or otherwise mechanically coupled to) front bumper region 411, and a second contact sensor assembly portion 402 is attached to a rear bumper region 412. This placement is also shown in the front view of FIG. 5, rear view FIG. 7, and top view FIG. 6.

The number and placement of sensor assembly portions 401, 402 illustrated in FIGS. 4-7 are not intended to be limiting. Sensor assembly portions may be placed anywhere on the exterior of vehicle 10 that may experience an impact event, such as any of the furthest protruding surfaces (as viewed from the top, as in FIG. 6). Examples include the front and rear quarter panels, the hood region, the rear hatch region, the door surfaces, and the like.

Figure 6:
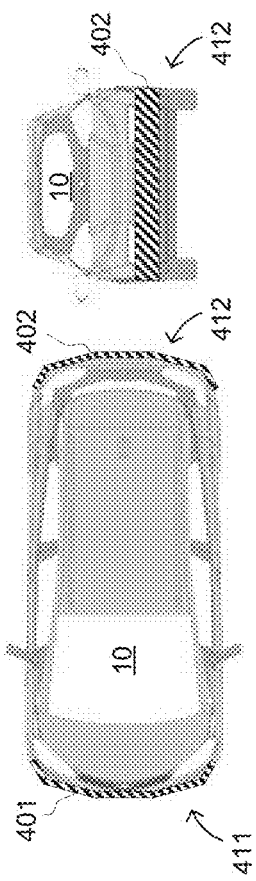
Figure 7:
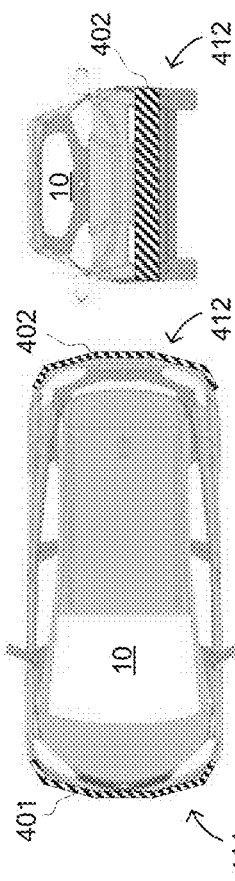

In some embodiments, sensor assembly portions 401 and 402 are each contiguous portions (as illustrated), but might also be segmented into multiple portions distributed along a given surface. In various embodiments, sensor assembly portions 401, 402 are positioned along a substantial portion of the front and back bumpers, as illustrated in FIG. 6. The width w (FIG. 5) of the various sensor assembly portions 401, 402 may vary depending upon design constraints and other factors. In one embodiment, for example, w is substantially uniform and has a value between about 10 cm and 20 cm. In other embodiments, width w varies over the length of portions 401, 402.

Figure 8:
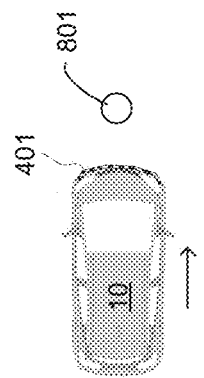
FIGS. 8-9 depict a vehicle, including a contact sensor assembly, making contact with an object in accordance with various embodiments.
Figure 9:
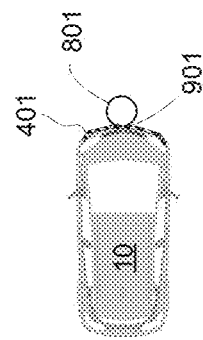

As described in further detail below, contact sensor assembly portions 401 and 402 are configured to produce an output that is indicative of portions 401 or 402 making contact with an external object. FIGS. 8-9 depict a vehicle, including a front bumper sensor assembly portion 401, initially in a moving, non-contact state (FIG. 8), and subsequently making contact with an object 801 (FIG. 9). As illustrated, object 801 makes contact within a region 901 of sensor assembly portion 401.

Referring now to FIG. 10 in conjunction with FIGS. 1-9, an exemplary contact sensor system 500 generally includes a contact detection module 520 configured to receive a contact sensor assembly output 530 and, under certain circumstances as described below, produce an appropriate brake control signal 512 that commands brake system 26 to take an action (e.g., apply full braking). Brake system 26 is also illustrated as receiving another brake control signal 511, which may be generated by the autonomous driving system 70 of FIG. 3. The signals 511 and 512 may take a variety forms, and may be digital or analog, as is known in the art. Furthermore, signals 511 and 512 may be communicated via any suitable channel, including a CAN or other such communication mode present within vehicle 10.

In accordance with various embodiments, brake system 26 is configured to prioritize signal 512 over signal 511. That is, brake control signal 512 effectively bypasses any other system or systems providing brake control signal 511. For example, considering again FIG. 9, in which contact sensor assembly portion 401 has just made contact with object 801, brake control signal 511 (e.g., from ADS 70) might indicate that no braking is necessary, while at the same time brake control signal 512 might indicate that full braking should be applied. In that scenario, brake system 26 would, in various embodiments, give precedence to brake control signal 512, effectively overriding the ADS 70. Because brake control signal 512 is produced with very low latency (due to the relatively uncomplicated model provided of module 520) it can react faster than many autonomous driving systems 70. In that regard, brake control signal 512 might be referred to as an "emergency brake signal."

Contact sensor assembly (or simply "sensor assembly") 401 includes a number of force sensors 505 incorporated into, attached to, or otherwise mechanically coupled to a membrane structure 501. Force sensors 505 may be distributed along membrane structure 501 at a consistent inter-sensor distance d, or may be placed at other, arbitrary locations, depending upon the desired design. For example, a higher density of sensors 505 may be included at certain points on the exterior of vehicle 10, such as near the corners of the front back bumpers (411 and 412 in FIG. 4).

Force sensors 505 may be implemented using any component or combination of components configured to produce force sensor signals 531 indicative of a force or pressure applied to a region of contact sensor assembly 401. A variety of force sensor devices (also referred to as load cells or pressure sensors) may be employed for this purpose, including, for example, piezoelectric load cells, hydraulic load cells, pneumatic load cells, capacitive force sensors, electromagnetic force sensors, optical fiber force sensors, potentiometric force sensors, and the like. In some embodiments, force sensors 505 are entirely embedded within membrane structure 501. Similarly, while not illustrated in FIG. 10, wires or other interconnects leading from sensors 505 to module 520 may be embedded within membrane structure 501.

Membrane structure 501 may be implemented as any thin band of material that is sufficiently deformable that it can be wrapped around a traditional vehicle bumper. For example, membrane structure 501 may be fabricated as a polymeric or composite material. In some embodiments, membrane structure 501 is a part of a bumper or other exterior component of vehicle 10. That is force sensors 505 may be embedded in (rather than attached to or applied to) any outwardly projecting component of vehicle 10.

Contact detection module 520 may be implemented in a variety of ways, including as machine learning model (e.g., a neural network, a decision tree, or the like) that has been trained via supervised or unsupervised learning. As can be appreciated, the various submodules shown in FIG. 10 can be combined and/or further partitioned to similarly provide the functionality described herein. In one embodiment, as illustrated, contact detection module 520 includes a filter sub-module 521 and a validation sub-module 522.

In general, filter sub-module 521 is configured to reduce or eliminate false-positives that might result from noise, random impacts with small objects (such as insects), and the like. In one embodiment, sub-module 521 implements a low-pass filter, as is known in the art. Validation sub-module 522 is also configured to reduce or eliminate false-positives by examining the various signals 530 and ensuring that the interpretation of output 530 is substantially correct. In one embodiment validation sub-module 522 inspects adjacent signals 531 to determine whether those signals are consistent with vehicle 10 making contact with an object. For example, sub-module 522 might observe that signal 532 indicates a prolonged, high local compressive force, while nearby signals 531 and 533 indicate a zero or baseline compressive force. In such a case (depending upon inter-sensor spacing d), module 522 might conclude that the signal 532 is invalid.

In accordance with various embodiments, contact detection module 520 is configured to produce brake control signal 512 only when the speed of vehicle 10 is below some predetermined threshold. In one embodiment, the predetermined speed threshold is 15 mph. In other embodiments, the speed threshold is lower or higher than 15 mph.

In accordance with various embodiments, contact detection module 520 is configured to produce brake control signal 512 when the apparent "shape" of the object meets some predetermined criteria, as judged by signals 531, 532, etc. That is, module 520 might provide brake control signal 512 when a predetermined number of force sensors 505 indicate a force above some threshold value.

In some embodiments, contact events are logged or otherwise recorded by ADS 70 (and potentially uploaded to an external server system) in order to keep track of and appropriately respond to such events. For example, a contact event may be used to automatically trigger an accident response (e.g., terminate ride, notify law enforcement, notify fleet operators, and the like). In some embodiments, instead of an automatic response, a human in a remote location might review video footage or other data relating the time of the incident to determine whether law enforcement should be notified.

Figure 11:
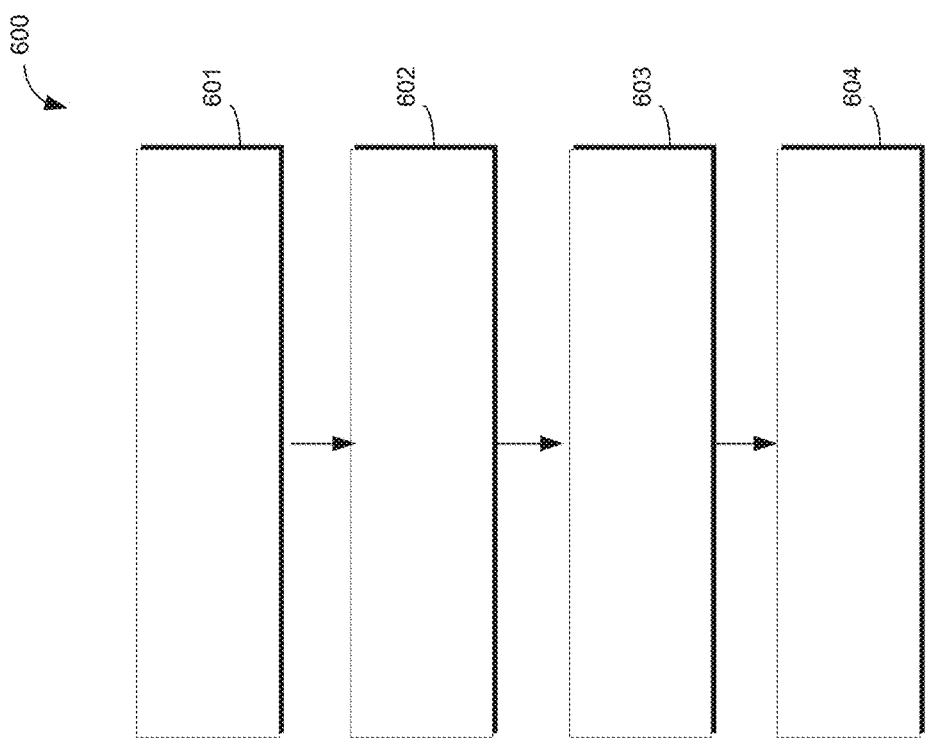
FIG. 11 is a flowchart illustrating a control method for controlling the autonomous vehicle, in accordance with various embodiments.

Referring now to FIG. 11, and with continued reference to FIGS. 1-10, the illustrated flowchart provides a control method 600 that can be performed by system 100 in accordance with the present disclosure. As can be appreciated in light of the disclosure, the order of operation within the method is not limited to the sequential execution as illustrated in FIG. 6, but may be performed in one or more varying orders as applicable and in accordance with the present disclosure. In various embodiments, the method 600 can be scheduled to run based on one or more predetermined events, and/or can run continuously during operation of the autonomous vehicle 10.

Initially, at 601, contact sensor assemblies 401, 402 are secured to, incorporated into, or otherwise mechanically coupled to vehicle 10. The nature of these assemblies is described above in conjunction with FIGS. 4-10. Subsequently, at 602, contact detection module 520 receives the output 530 of contact sensor assembly 401. This output 530 includes data regarding the compressive (or other mode) state of sensors 505.

Next, at 603, contact detection module 520 determines, based on output 530, that contact sensor assembly 401 or 402 has made physical contact with an object. This will generally result in elastic deformation of membrane structure 501 and output(s) from force sensors 505 above some baseline level.

Finally, at 604, a brake control signal (512) is produced based on the output of contact sensor assembly 401 and other factors, such as vehicle speed. For example, contact detection module 520 may produce brake control signal 512 when the speed of vehicle 10 is below a predetermined value, as discussed above. The nature of brake control signal 512 may vary, depending upon the output 530 of contact sensor assembly 401. In one embodiment, for example, signal 512 is an "apply full breaks" signal, as is known in the art. In other embodiments, a lower level of braking is applied.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A contact sensor method for a vehicle, the method comprising:
   providing a contact sensor assembly mechanically coupled to an exterior surface of the vehicle;
   receiving an output of the contact sensor assembly;
   operating the vehicle utilizing a brake system configured to respond to a first brake control signal;
   determining, with a processor, that the contact sensor assembly has made contact with an object based on the output of the contact sensor assembly;
   producing a second brake control signal based, in part, on the output of the contact sensor assembly; and
   activating the brake system in response to the second brake control signal to override the first brake control signal.

2. The method of claim 1, wherein the second brake control signal indicates that full braking should be applied.

3. The method of claim 1, wherein the contact sensor assembly includes a membrane structure and a plurality of force sensors embedded within the membrane structure.

4. The method of claim 1, further including applying a low-pass filter to the output of the contact sensor assembly.

5. The method of claim 1, further including validating the output of the contact sensor assembly by observing multiple force sensor outputs produced by the contact sensor assembly.

6. The method of claim 1, wherein the contact sensor assembly is mechanically coupled to at least one of a front bumper and a rear bumper of the vehicle.

7. An autonomous vehicle comprising:
   an autonomous driving system configured to produce a first brake control signal;
   a contact sensor assembly mechanically coupled to an exterior surface of the autonomous vehicle,
   a contact detection module communicatively coupled to the contact sensor assembly, the contact detection module configured to produce a second brake control signal; and
   a brake system configured to control braking of the autonomous vehicle, the brake system configured to prioritize the second brake control signal over the first brake control signal.

8. The autonomous vehicle of claim 7, wherein the second brake control signal indicates that full braking should be applied.

9. The autonomous vehicle of claim 7, wherein the contact sensor assembly includes a membrane structure and a plurality of force sensors embedded within the membrane structure.

10. The autonomous vehicle of claim 7, wherein the contact detection module includes a low-pass filter.

11. The autonomous vehicle of claim 7, wherein the contact detection module includes a validation sub-module configured to observed multiple force sensor outputs produced by the contact sensor assembly.

12. The autonomous vehicle of claim 7, wherein the contact sensor assembly is mechanically coupled to at least one of a front bumper and a rear bumper of the vehicle.

13. A system for controlling a vehicle, comprising:
    a contact detection module configured to produce an emergency brake control signal based on an output of a contact sensor assembly mechanically coupled to an exterior surface of the vehicle; and
    a brake system configured to control braking of the vehicle, the brake system configured to prioritize the emergency brake control signal over at least one additional brake control signal received by the brake system.

14. The system of claim 13, wherein the second brake control signal indicates that full braking should be applied.

15. The system of claim 13, wherein the contact sensor assembly includes a membrane structure and a plurality of force sensors embedded within the membrane structure.

16. The system of claim 13, wherein the contact detection module includes a low-pass filter.

17. The system of claim 13, wherein the contact detection module includes a validation sub-module configured to observed multiple force sensor outputs produced by the contact sensor assembly.

18. The system of claim 13, wherein the contact sensor assembly is mechanically coupled to at least one of a front bumper and a rear bumper of the vehicle.

19. The system of claim 14, wherein the contact detection module is further configured to store, within an autonomous driving system, events associated with the emergency brake control signal.

* * * * *